(12) United States Patent
Sawyer

(10) Patent No.: US 6,418,010 B1
(45) Date of Patent: Jul. 9, 2002

(54) CONVERTIBLE FLAT PANEL DISPLAY HANGING SUPPORT

(75) Inventor: Michael D. Sawyer, Sioux City, IA (US)

(73) Assignee: Gateway, Inc., Poway, CA (US)

( * ) Notice: Subject to any disclaimer, the term of this patent is extended or adjusted under 35 U.S.C. 154(b) by 21 days.

(21) Appl. No.: 09/637,974

(22) Filed: Aug. 11, 2000

(51) Int. Cl.⁷ .................................................. G06F 1/16
(52) U.S. Cl. ..................... 361/681; 361/801; 312/223.2; 248/918
(58) Field of Search ................................. 361/681–687, 361/759, 801; 345/169, 905; 312/223.1–223.6, 223.7, 2; 248/917–924

(56) References Cited

U.S. PATENT DOCUMENTS

| | | | |
|---|---|---|---|
| 4,438,458 A | * 3/1984 | Munscher | 312/251 |
| 5,544,006 A | 8/1996 | Radloff et al. | 361/683 |
| 5,579,210 A | 11/1996 | Ruhland et al. | 361/816 |
| 5,640,309 A | 6/1997 | Carney et al. | 361/801 |
| 5,673,175 A | 9/1997 | Carney et al. | 361/686 |
| 5,748,453 A | 5/1998 | Carney et al. | 361/801 |
| 5,757,618 A | 5/1998 | Lee | 361/686 |
| 5,822,193 A | 10/1998 | Summers et al. | 361/759 |
| 5,822,196 A | 10/1998 | Hastings et al. | 361/801 |
| 5,890,693 A | 4/1999 | Do et al. | 248/346.03 |
| 5,909,359 A | 6/1999 | Summers et al. | 361/748 |
| 6,081,420 A | * 6/2000 | Kim et al. | 361/681 |
| 6,132,326 A | * 10/2000 | Schweid et al. | 473/553 |
| 6,262,884 B1 | * 7/2001 | Hwang et al. | 361/681 |

* cited by examiner

Primary Examiner—Darren Schuberg
Assistant Examiner—Hung Van Duong
(74) Attorney, Agent, or Firm—Mark S. Walker

(57) ABSTRACT

A convertible hanging support or mount for a flat panel display monitor is disclosed. The mount is capable of allowing the monitor to be hung from an object such as a cubical wall, a door, a tower or mini-tower computer case, an automobile or aircraft seat back, or the like while retaining the ability to support the monitor on a generally horizontal surface such as a table or desk top surface.

21 Claims, 5 Drawing Sheets

CONVERTIBLE FLAT PANEL DISPLAY HANGING SUPPORT

FIELD OF THE INVENTION

The present invention generally relates to flat panel display monitors, and more particularly to supporting apparatus for supporting a flat panel display monitor so that it may be viewed by a user.

BACKGROUND OF THE INVENTION

Flat panel display monitors are becoming increasingly popular primarily because they may be placed in much narrower spaces than conventional cathode ray tube (CRT) display monitors due to their shallow depth. Such monitors are typically provided with a supporting mount such as a pedestal mount, picture frame mount, or the like providing a tilting mechanism for allowing a user to tilt the monitor vertically (and often horizontally). In this manner, the user may adjust the monitor's tilt angle to suit his or her viewing needs. For example, a taller user may tilt the monitor upward, while a shorter user will normally tilt the monitor downward, to provide a viewing angle that is substantially normal to the surface of flat panel display. Because the pedestal must support the monitor if it is tilted to an extreme angle, its base must be made sufficiently large to prevent the monitor from tipping over. Consequently, the depth of the base must be substantially thicker than the monitor itself, reducing the attractiveness of the monitor and increasing the size of its "footprint" (i.e., the amount of desk space required by the monitor).

Consequently, it may often be desirable to remove the monitor from the desktop entirely. For example, it may be desirable to hang the monitor from a wall, shelf or the like. Known to the art are mounting devices having bases which may be clamped to a surface such as the edge of the desktop, a pole, or the like. However, such mounting devices cannot be used to support the monitor in the absence of the surface to which they are designed to be clamped. Thus, if the user desires to set the monitor on a desktop, a second stand must be provided. Accordingly, it would be advantageous to provide a support or mount for a flat panel display monitor that is capable of allowing the monitor to be hung from objects such as a cubical wall, a tower or mini-tower case, an automobile or aircraft seat back, a bookshelf, or the like while retaining the ability to support the monitor on a generally horizontal surface such as a table or desk top surface.

SUMMARY OF THE INVENTION

The present invention is directed to a convertible hanging support or mount for a flat panel display monitor that is capable of allowing the monitor to be hung from an object such as a cubical wall, a tower or mini-tower case, an automobile or aircraft seat back, a bookshelf, or the like while retaining the ability to support the monitor on a generally horizontal surface such as a table or desk top surface. In an exemplary embodiment, the mount is comprised of a support including a first segment and a second segment. A mount is coupled to the support for attaching the support to the flat panel display monitor. The second segment is joined to the first segment so that the support may move or fold between a first position wherein the second segment extends outward from the first segment and a second position wherein the second segment is disposed generally adjacent to the first segment. In this manner, the support is suitable for attachment to an object such as a cubical wall, seat back, tower or mini-tower computer case, or the like, when folded to the first position and forms a stand for supporting the monitor on a generally horizontal surface when folded to the second position.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally to FIGS. 1 through 6, a monitor assembly 100 comprised of a flat panel display monitor 102 having a convertible hanging support 104 in accordance with an exemplary embodiment of the present invention is described. The convertible hanging support 104 is capable of being configured for suspending or hanging the monitor 102 from a generally vertically oriented object such as a cubical wall, a door, a tower or mini-tower computer case, an automobile or aircraft seat back, or the like (see FIGS. 3 and 4) or an elevated horizontal surface such as a shelf (see FIG. 6). The convertible hanging support 104 is further capable of being configured to function as a stand for supporting the monitor 102 on top of a generally horizontal surface such as a table or desk top surface (see FIG. 5). In each configuration, the hanging support 104 provides a stable platform for supporting the monitor 102 while reducing or eliminating the monitor's footprint.

Figure 1:
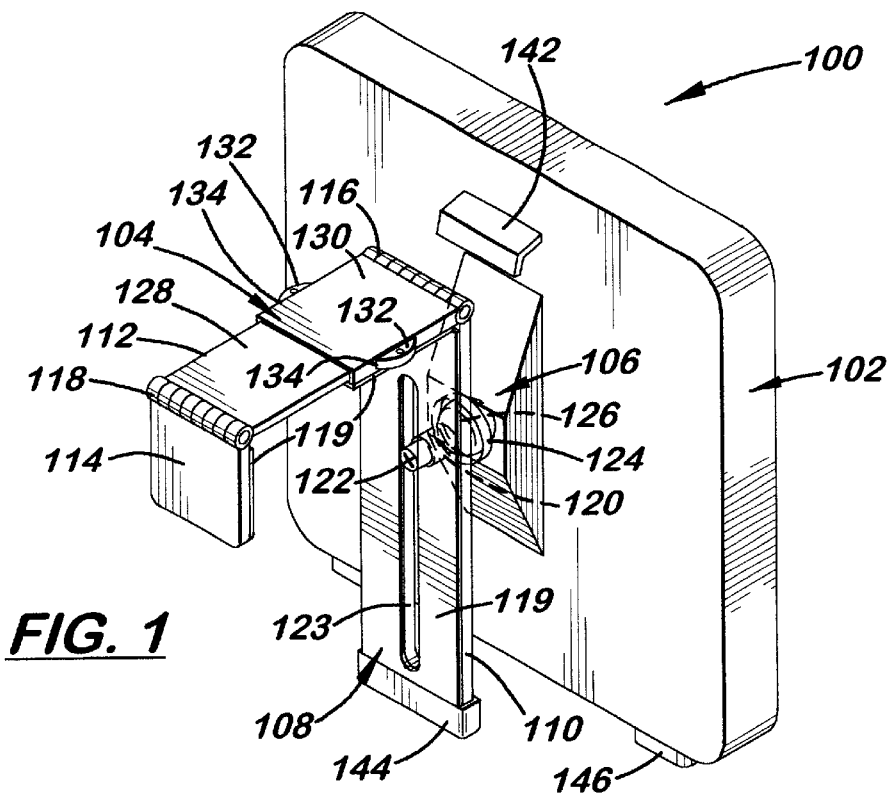
FIG. 1 is an isometric view of a flat panel display monitor assembly having a convertible hanging support in accordance with an exemplary embodiment of the present invention.
Figure 2:
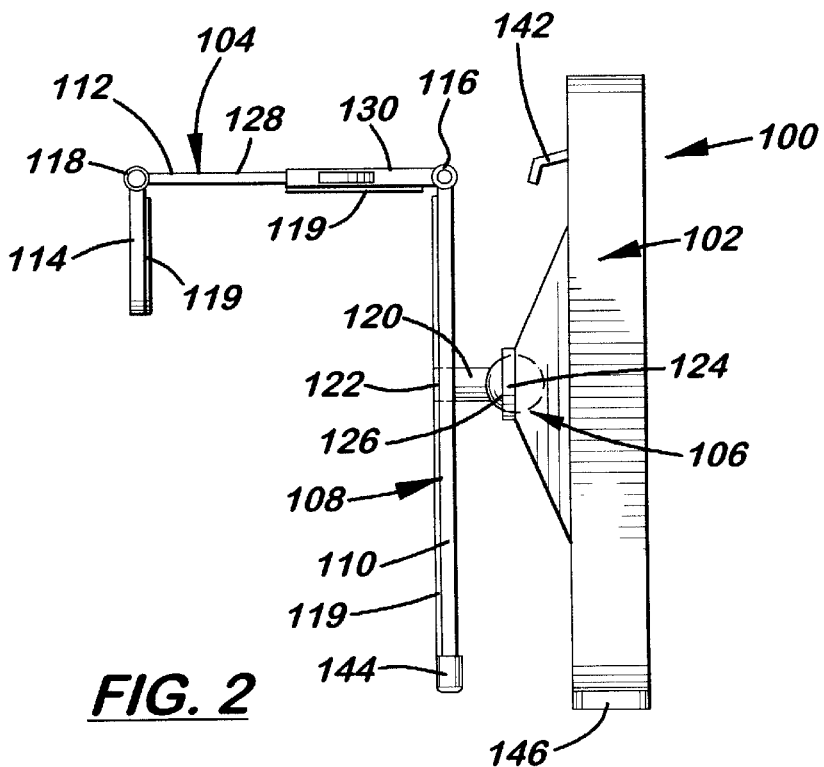
FIG. 2 is a side elevation view of the flat panel display monitor assembly shown in FIG. 1.

As shown in FIGS. 1 and 2, the convertible hanging support 104 of the present invention includes a mount 106 attachable to the back surface of the flat panel display monitor 102. The mount 106 is coupled to a hanging support 108 comprised of a first segment 110 and a second segment 112. The second segment 112 is joined to the first segment 110 so that the support 108 may fold between a first position (shown generally in FIGS. 1 through 4) wherein the second segment 112 extends outwardly from the outer surface of the first segment 110 and a second position (shown in FIG. 5) wherein the bottom surface of second segment 112 is disposed generally adjacent to the outer surface of the first segment 110. In one embodiment, a third segment 114 may be joined to the second segment 112 opposite the first segment 110. The third segment 114 extends downwardly from the bottom surface of the second segment 112 when the support 108 is folded in the first position, as shown in FIGS. 1 through 4, and may be doubled against the bottom surface of the second segment 112 when the support 108 is folded in the second position, as shown in FIG. 5. Alternately, the third segment 114 may be an integral part of the second segment 112 so that the second segment has a generally L-shaped cross-section.

In exemplary embodiments of the invention, the first, second and third segments 110, 112 & 114 are comprised of flattened plates formed of a suitable material such as a metal or rigid plastic. However, it will be appreciated by those of skill in the art that the segments 110, 112 & 114 may be shaped for aesthetic purposes, for added strength, or due to manufacturing limitations and may further provide an antenna for wireless communication between the monitor 102 and other devices without departing from the scope and spirit of the present invention.

As shown in FIGS. 1 and 2, the first segment 110 is joined along its upper edge to the inner edge (i.e., the edge nearest the monitor 102) of the second segment 112 via hinge 116. Similarly, the second segment 112 is joined along its outer edge (i.e., the edge farthest away from the monitor 102) to the inner edge of the second segment 112 via hinge 118. Preferably, hinge 116 includes one or more stops (not shown) for fixing and maintaining the angle between the first and second segments 110 & 112. For example, as shown in FIGS. 1 through 4, the hinge 116 may include a stop that prevents the second segment 112 from pivoting upwardly about the hinge 116 past a position approximately normal to the inner surface of the first segment 110. Likewise, hinge 118 may also include one or more stops (not shown). For example, hinge 118 may include a stop that prevents the third segment 114 from pivoting outwardly about the hinge 118 past a position approximately normal to the bottom surface of the second segment 112. In this manner, the hanging support 104, when folded in the first position as shown in FIGS. 1 through 4, may form an inverted, generally U-shaped hook that may be placed over the top of a generally vertically oriented object such as a cubical wall, a door, a tower or mini-tower computer case, an automobile or aircraft seat back, or the like (see FIGS. 3 and 4) or small elevated horizontal surfaces, such as a narrow shelf. First, second and third segments 110, 112 & 114 may further include one or more textured or rubberized surfaces 119 for preventing movement between the support 104 and the object to which it is mounted.

In the exemplary embodiment shown in FIGS. 1 through 5, the mount 106 may be comprised of a first portion 120 suitable for attachment to the first segment 110 of support 108 via a fastener 122 such as a screw, bolt, or the like. As shown in FIG. 1, the fastener 122 may extend through an elongated slot 123 formed in the first segment 110 so that the vertical position of the hanging support 104 may be adjusted relative to the monitor 102. This adjustment may be accomplished by first loosening the fastener 122 within the slot 123, sliding the fastener 122 within the slot 123 to attain the desired vertical positioning of the hanging support 104 relative to the monitor 102, and again tightening the fastener 122 to secure the hanging support 104 in the desired position. Alternately, first portion 120 of mount 106 may include a quick connect mechanism to secure the support 104 and mount 106 together and/or latching mechanisms such as a cog that engages teeth formed in the slot 123 to lock the hanging support 104 in place.

The first portion 120 of mount 106 is coupled to a second portion 124 attached to the back surface (or, alternately the top, bottom or side) of the flat panel display monitor 102 via a joint such as ball and socket joint 126. The ball and socket joint 126 allows the monitor 102 to pivot both vertically and horizontally so that a user may adjust the monitor's tilt angle to suit his or her viewing needs. For example, as discussed above, a taller user may tilt the monitor 102 upward, while a shorter user will normally tilt the monitor 102 downward, to provide a viewing angle that is substantially normal to the surface of flat panel display (not shown). Similarly, if the monitor 102 is positioned to the side of the user, it may be pivoted horizontally to provide a better viewing angle. Alternately, instead of a ball and socket joint 126, the mount 106 may utilize other tilt mechanisms contemplated by those of ordinary skill in the art for allowing vertical and/or horizontal tilting of the monitor 102, or may rigidly attach the monitor 102 to the support 108, providing no adjustment of tilt angle. For example, an exemplary mount 106 may employ a single hinge type pivot that allows tilting of the monitor 102 in a vertical plane. Such alterations to the exemplary embodiment shown in FIGS. 1 through 5 would not depart from the scope and spirit of the present invention.

In exemplary embodiments of the invention, the width of the support 108 may be adjusted to fit over a variety of objects. For instance, in the embodiment shown in FIGS. 1 through 4, the second segment 112 of support 108 may be comprised of two or more telescoping segment portions such as inner and outer segment halves 128 & 130. The inner segment half 128 may slide into and out of the outer segment half 130 so that the length of the second segment 112, and thus the width of the support 108, may be increased or decreased. The segment halves 128 & 130 may include an internal latching mechanism for securing the segment halves 128 & 130 in the desired length. In an exemplary embodiment, this latching mechanism may include a spring-biased latch assembly 132 disposed in the outer segment half 130 that engages the inner segment half 128 to hold it in place. Pressure plates 134 of the latch assembly 132 are depressed to overcome the spring bias to disengage the assembly 132 and allow the inner segment half 128 to slide within the outer segment half 130 so that the length of the second segment 112 may be increased or decreased.

In alternate embodiments of the present invention, the second segment 112 may be fixed in length so that support 108 has a fixed width. In such embodiments, hanging supports 104 may be provided in several widths depending on the type of object to which the monitor 102 was to be mounted. For instance, a first hanging support 104 may have a support 108 wherein the support's second segment is 4 inches long. Such a hanging support 104 would be suited for mounting the monitor 102 to a cubical wall, door, or the like. Similarly, a second hanging support 104 may have a support 108 wherein the support's second segment is approximately 10 inches long making the support suitable for mounting the monitor to a tower or mini-tower computer case.

Figure 3:
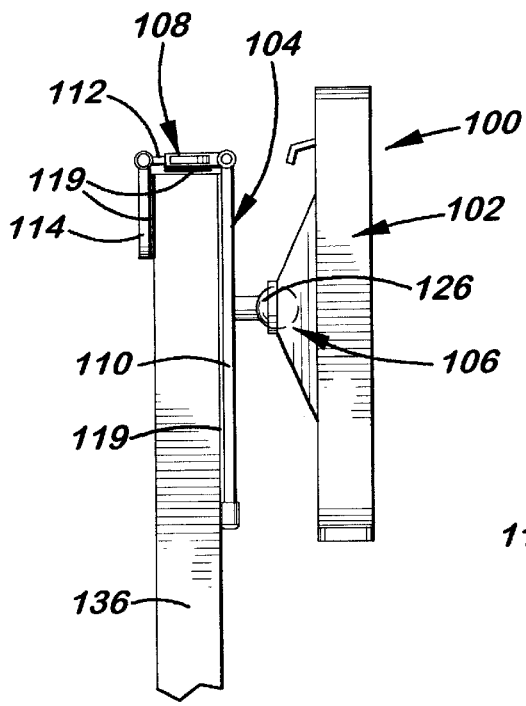
FIG. 3 is a side elevation view of the flat panel display monitor assembly shown in FIG. 1, illustrating use of the convertible hanging support to mount the monitor to a cubical wall.
Figure 4:
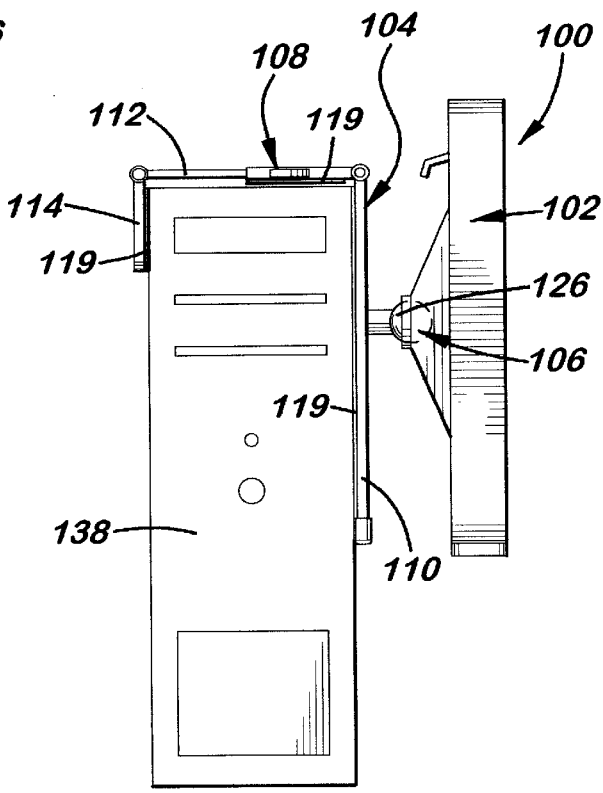
FIG. 4 is a side elevation view of the flat panel display monitor assembly shown in FIG. 1, illustrating use of the convertible hanging support to mount the monitor to a tower or mini-tower computer case.
Figure 5:
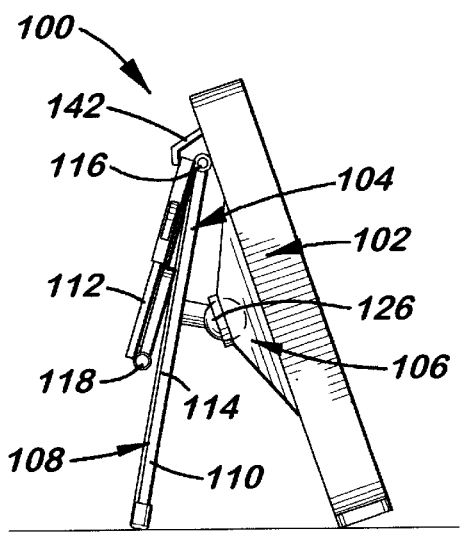
FIG. 5 is a side elevation view of the flat panel display monitor assembly shown in FIG. 1, wherein the convertible hanging support has been folded for use as a desktop stand.

Referring now to FIGS. 3 and 4, use of the convertible hanging support 104 for mounting a monitor to a generally vertically oriented object is described. In FIGS. 3 and 4, support 108 is shown as being folded to its first position wherein the second segment 112 extends outwardly from the outer surface of the first segment 110. In this position, the support 108 forms an inverted, generally U-shaped hook that may be placed over the top of a generally vertically oriented object such as a cubical wall 136, as shown in FIG. 3 or a tower or mini-tower computer case 138, as shown in FIG. 4, or, in a like fashion, a small elevated horizontal surfaces, such as a narrow shelf. As shown, the first and third segments 110 & 114 of the support 108 oppose each other to provide a gripping action for preventing the hanging support 104 from sliding off the object (i.e., cubical wall 136 or computer case 138). Hinges 116 and 118 may be further spring biased to provide a gripping pressure between the first and third segments 110 & 114 to hold the support 104 in place.

The width of the support 108 may be adjusted to fit the specific object to which the monitor is mounted. For instance, if the monitor 102 is to be mounted to the top of a cubical wall 136, as shown in FIG. 3, the length of the second segment 112 is adjusted to be slightly greater than the width of the cubical wall 136 (typically about 2 to 4 inches). Support 108, folded to the first position, is slipped over the top of the cubical wall 136 to hang the monitor 102. The monitor may then be pivoted vertically and/or horizontally about the ball and socket joint 126 of mount 106 so that a user may adjust the monitor's tilt angle to suit his or her viewing needs. Similarly, if the monitor 102 is to be mounted to the top of computer case 138, as shown in FIG. 4, essentially converting the separate monitor 102 and computer case 138 into an integrated "all in one" type computer system with the monitor 102 mounted directly to the case 138. In this embodiment, the length of the second segment 112 of support 108 is adjusted to be slightly greater than the width of the case 138 (typically about 6 to 8 inches) and the support 108 slipped over the top of the case 138. The monitor may then be pivoted vertically and/or horizontally about the ball and socket joint 126 of mount 106 so that a user may adjust the monitor's tilt angle to suit his or her viewing needs.

Referring now to FIG. 5, the convertible hanging support 104 is shown folded for use as a desktop stand in accordance with an exemplary embodiment of the invention. Support 108 is folded to its second position wherein the bottom surface of second segment 112 is disposed generally adjacent to the outer surface of the first segment 110. Similarly, the third segment 114 may be doubled against the bottom surface of the second segment 112. The monitor 102 is pivoted vertically about ball and socket joint 126 of mount 106 so that hinge 116 is rotated toward, and may optionally contact, the back surface of the monitor 102. This places first segment 110 at an angle to the back surface of the monitor 102 thereby providing an A-shaped support for supporting the monitor 102 on any generally horizontal surface 140 such as a desktop, tabletop or the like. A tab, groove, catch or like structure 142 may be provided for engaging the hinge 118 thereby holding the hanging support 104 in the A-shaped configuration. Further, as shown in FIGS. 1 through 6, first segment 110 and monitor 102 may include skid resistant supports such as a boot 144 and legs 146 for preventing the monitor assembly 100 from sliding on the horizontal surface 140. If the user later wishes to hang the monitor 102 on an object, for example on a cubical wall 136, as shown in FIG. 3, support 108 may again be folded to the first position, shown in FIGS. 1 through 4.

Figure 6:
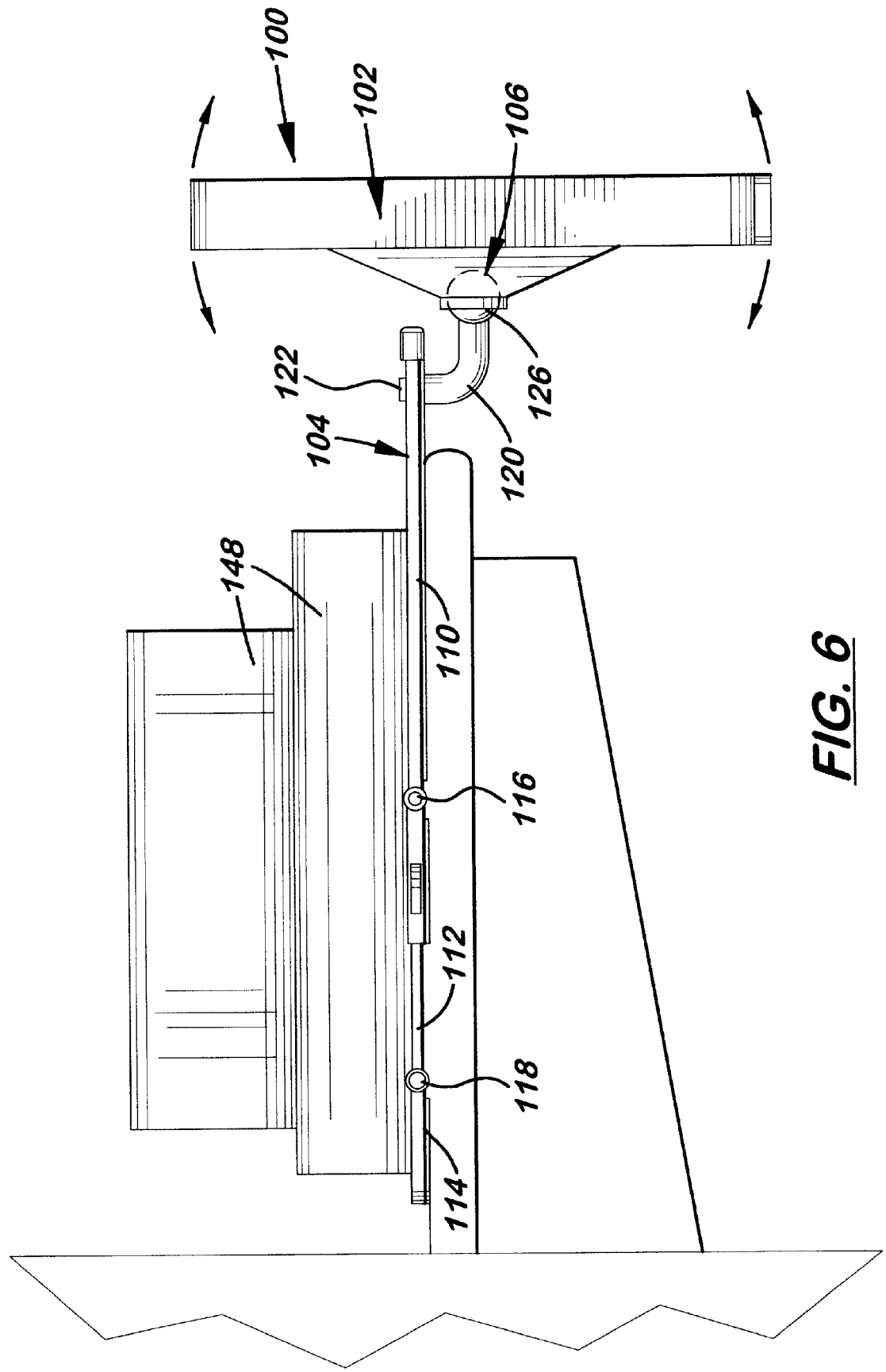
FIG. 6 is a side elevation view of the flat panel display monitor assembly shown in FIG. 1, wherein the convertible hanging support is folded to mount the monitor to a bookshelf.

Referring now to FIG. 6, in an exemplary embodiment, the convertible hanging support 104 of the present invention may also be utilized to support the monitor 102 from a generally horizontally oriented object such as a shelf, the edge of a table or desk top, or the like 146. In the exemplary embodiment shown, first and second segments 110 & 112 may be pivoted about hinge 116 and second and third segments 112 & 114 may be pivoted about hinge 118 so that the first, second and third segments 110, 112 & 114 are aligned end to end. If necessary, mount 106 may be moved toward the bottom end 142 of the first segment 110 by first loosening fastener 122 within the slot 123 formed in the first segment 110 allowing the fastener 122 to be slid toward the end of the slot 123. The fastener 122 may then be retightened to secure the mount 106 in the desired position. The hanging support 104 may then be placed under one or more objects 148, such as books or the like, having sufficient weight to hold the support 104 against the horizontal object 146 thereby supporting the monitor 102. The monitor may then be pivoted vertically and/or horizontally about the ball and socket joint 126 of mount 106 so that it is generally perpendicular to support 104 and so that a user may adjust the monitor's tilt angle to suit his or her viewing needs. As shown in FIG. 6, the first portion 120 of mount 106 may extend past the end of first segment 110 for allowing the monitor 102 to be tilted upward through a greater angle.

Referring generally to FIGS. 7 through 11, a flat panel display monitor assembly 200 in accordance with another exemplary embodiment of the present invention is shown. Like the embodiment shown in FIGS. 1 through 6, the flat panel display monitor assembly 200 shown in FIGS. 7 through 11 is comprised of a flat panel display monitor 202 having a convertible hanging support 204 capable of allowing the monitor 202 to be hung from a generally vertically oriented object such as a cubical wall, a door, a tower or mini-tower computer case, an automobile or aircraft seat back, or the like (see FIGS. 9 and 10) while also functioning as a stand for supporting the monitor 202 on top of a generally horizontal surface such as a table or desk top surface (see FIG. 11).

Figure 7:
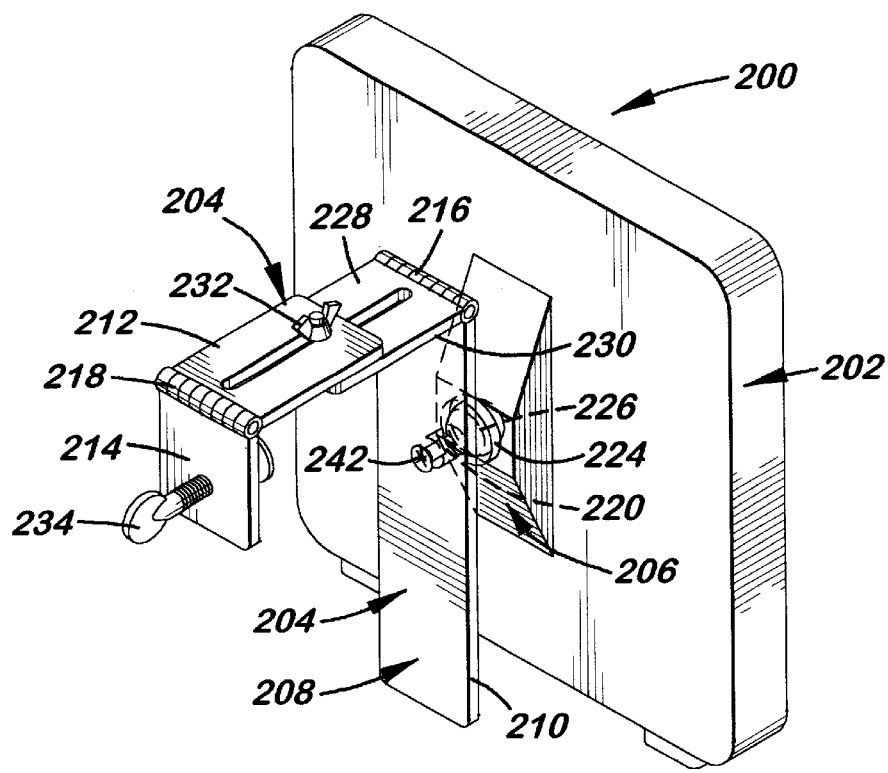
FIG. 7 is an isometric view of a flat panel display monitor assembly having a convertible hanging support in accordance with a second exemplary embodiment of the present invention.
Figure 8:
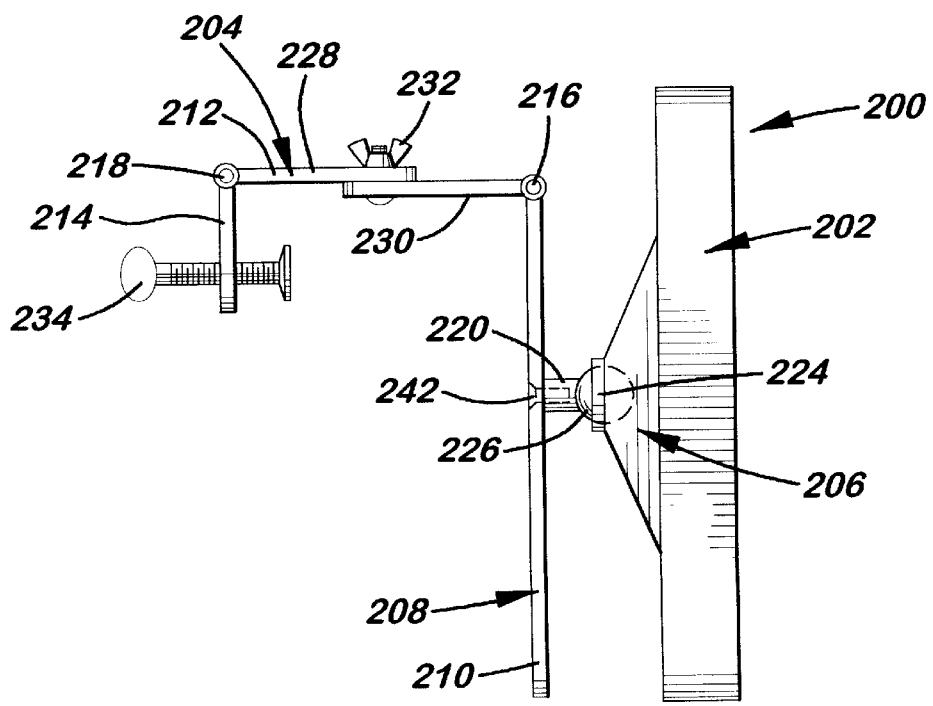
FIG. 8 is a side elevational view of the flat panel display monitor assembly shown in FIG. 7.

As shown in FIGS. 7 and 8, the convertible hanging support 204 includes a mount 206 attachable to the back surface of the flat panel display monitor 202. The mount 206 is coupled to a hanging support 208 comprised of a first segment 210 and a second segment 212. The second segment 212 is joined to the first segment 210 so that the support 208 may fold between a first position (shown generally in FIGS. 7 through 10) wherein the second segment 212 extends outwardly from the outer surface of the first segment 210 and a second position (shown in FIG. 11)

wherein the bottom surface of second segment 212 is disposed generally adjacent to the outer surface of the first segment 210. A third segment 214 may be joined to the second segment 212 opposite the first segment 210. In one embodiment, the third segment 214 extends downwardly from the bottom surface of the second segment 212 when the support 208 is folded in the first position, as shown in FIGS. 7 through 10, and may be doubled against the bottom surface of the second segment 212 when the support 208 is folded in the second position, as shown in FIG. 11. Alternately, the third segment 214 may be rigidly attached as an integral part of the second segment 212 so that the second segment has a generally L-shaped cross-section.

In exemplary embodiments of the invention, the first, second and third segments 210, 212 & 214 are comprised of flattened plates formed of a suitable material such as a metal or rigid plastic. Alternately, the segments 210, 212 & 214 may be shaped for aesthetic purposes, for added strength, or due to manufacturing as contemplated by those of ordinary skill in the art. As shown in FIGS. 7 and 8, the first segment 210 is joined along its upper edge to the inner edge (i.e., the edge nearest the monitor 202) of the second segment 212 via hinge 216. Similarly, the second segment 212 is joined along its outer edge (i.e., the edge farthest away from the monitor 202) to the inner edge of the second segment 212 via hinge 218. Preferably, hinge 216 includes a stop (not shown) that prevents the second segment 212 from pivoting upwardly about the hinge 216 past a position approximately normal to the inner surface of the first segment 210. Likewise, hinge 218 may also include a stop (not shown) that prevents the third segment 214 from pivoting outwardly about the hinge 218 past a position approximately normal to the bottom surface of the second segment 212. In this manner, the hanging support 204, when folded in the first position as shown in FIGS. 7 through 10, forms an inverted, generally U-shaped hook that may be placed over the top of a generally vertically oriented object such as a cubical wall, a door, a tower or mini-tower computer case, an automobile or aircraft seat back, or the like (see FIGS. 9 and 10) or small elevated horizontal surfaces, such as a narrow shelf.

As shown in FIGS. 7 through 11, the mount 206 may be comprised of a first portion 220 suitable for attachment to the first segment 210 of support 208 via a fastener 222 such as a screw, bolt, or the like. The first portion 220 of mount 206 is coupled to a second portion 224 attached to the back surface (or, alternately, the top, bottom or side) of the flat panel display monitor 202 via a joint such as ball and socket joint 226. The ball and socket joint 226 allows the monitor 202 to pivot both vertically and horizontally so that a user may adjust the monitor's tilt angle to suit his or her viewing needs. For example, as discussed above, a taller user may tilt the monitor 202 upward, while a shorter user will normally tilt the monitor 202 downward, to provide a viewing angle that is substantially normal to the surface of flat panel display (not shown). Similarly, if the monitor 202 is positioned to the side of the user, it may be pivoted horizontally to provide a better viewing angle.

Alternately, instead of a ball and socket joint 226, the mount 206 may utilize other tilt mechanisms contemplated by those of ordinary skill in the art for allowing vertical and/or horizontal tilting of the monitor 202, or may rigidly attach the monitor 202 to the support 208, providing no adjustment of tilt angle. For example, an exemplary mount 206 may employ a single hinge type pivot that allows tilting of the monitor 202 in a vertical plane. Such alterations to the exemplary embodiment shown in FIGS. 7 through 11 would not depart from the scope and spirit of the present invention.

In an exemplary embodiment, the hanging support 204 of the present invention may also be utilized to support the monitor 202 from a generally horizontally oriented object such as a shelf, the edge of a table or desk top, or the like. Mount 206 may be detached from the first segment 210 of support 208 by removing fastener 242. The mount 206 may then be reattached to the second segment 212 using the removed fastener 242. This allows the support 208 to be used as a clamp to clamp the monitor/hanging support assembly 200 to the generally horizontally disposed object such that the first and third segments 210 & 214 are disposed above and below the object.

In exemplary embodiments of the invention, the width of the support 208 may be adjusted to fit over a variety of objects. For instance, in the embodiment shown in FIGS. 7 through 10, the second segment 212 of support 208 may be comprised of overlapping upper and lower segment plates 228 & 230 which slide in relation to each other so that the length of the second segment 212, and thus the width of the support 208, may be increased or decreased. These segment plates 228 & 230 may include longitudinally disposed, elongated aperture aligned with each other so that a clamping assembly 232 may extend there through. The clamping assembly 232 is loosened to allow the segment plates 228 & 230 to slide against each other so that the length of the second segment 212 may be increased or decreased and tightened to clamp the segment plates 228 & 230 together to secure the second segment 212 at a desired length. In FIGS. 7 through 11, clamping assembly is shown as being comprised of a bolt extending through the segment plate apertures so that a nut (a wingnut is shown) may be threaded onto its upper end. However, those skilled in the art will recognize that a variety of clamping schemes may be utilized without departing from the scope and spirit of the present invention. For example, in one alternate embodiment the lower segment plate 230 may be provided with a single threaded hole instead of the longitudinal aperture shown. A thumbscrew may then be threaded into this hole through the longitudinal aperture formed in the upper segment plate 228. Similarly, one segment plate 228 or 230 may slide within grooves or channels formed in the second. A fastener such as a screw, bolt, cam assembly, or the like may be utilized to clamp the segment plates together so that the length of the second segment 212 may be adjusted.

In alternate embodiments of the present invention, the second segment 212 may be fixed in length so that support 208 has a fixed width. In such embodiments, hanging supports 204 may be provided in several widths depending on the type of object to which the monitor 202 was to be mounted. For instance, a first hanging support 204 may have a support 208 wherein the support's second segment is 4 inches long. Such a hanging support 204 would be suited for mounting the monitor 202 to a cubical wall, door, or the like. Similarly, a second hanging support 204 may have a support 208 wherein the support's second segment is approximately 10 inches long making the support suitable for mounting the monitor to a tower or mini-tower computer case.

In one embodiment, an adjustable pressure plate assembly 234 may be provided to adjust the width of the support 208, and/or to tighten the support 208 onto the object to which it is attached. For instance, as shown in FIGS. 7 and 8, an exemplary pressure plate assembly 234 may be comprised of a small plate that is suitable for engaging the surface of an object to which the support 208 is mounted. This plate is attached to a thumbscrew that is threaded through a hole formed in the third segment 214. By screwing the thumbscrew into or out of the hole, the plate is urged toward or away from the surface of the object, tightening or loosening the pressure plate assembly 234 so that the support 208 is held securely on the object.

Figure 9:
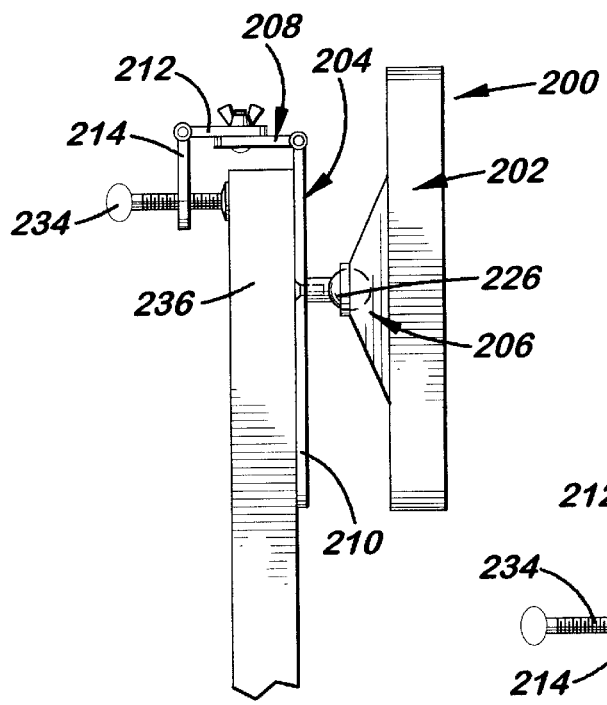
FIG. 9 is a side elevation view of the flat panel display monitor assembly shown in FIG. 7, illustrating use of the convertible hanging support to mount the monitor to a cubical wall.
Figure 10:
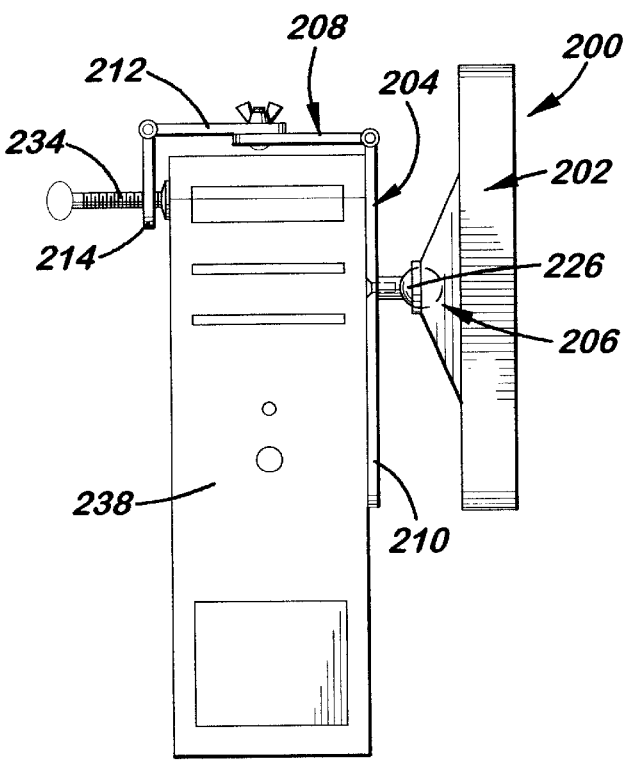
FIG. 10 is a side elevation view of the flat panel display monitor assembly shown in FIG. 7, illustrating use of the convertible hanging support to mount the monitor to a tower or mini-tower computer case.
Figure 11:
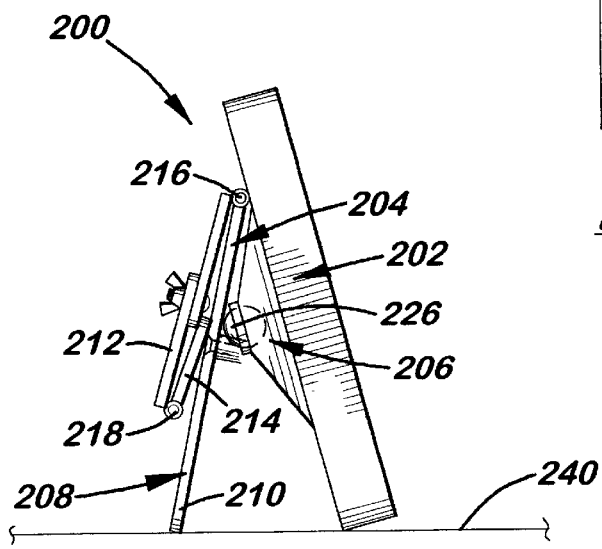
FIG. 11 is a side elevation view of the flat panel display monitor assembly shown in FIG. 7, wherein the convertible hanging support has been folded for use as a desktop stand.

Referring now to FIGS. 9 and 10, use of the convertible hanging support 204 for mounting a monitor to a generally vertically oriented object is described. In FIGS. 9 and 10, support 208 is shown as being folded to its first position wherein the second segment 212 extends outwardly from the outer surface of the first segment 210. In this position, the support 208 forms an inverted, generally U-shaped hook that may be placed over the top of a generally vertically oriented object such as a cubical wall 236, as shown in FIG. 3 or a tower or mini-tower computer case 238, as shown in FIG. 10, or, in a like fashion, a small elevated horizontal surfaces, such as a narrow shelf. As shown, the first and third segments 210 & 214 of the support 208 oppose each other to provide a gripping action for preventing the hanging support 204 from sliding off the object (i.e., cubical wall 236 or computer case 238).

The width of the support 208 may be adjusted to fit the specific object to which the monitor is mounted. For instance, if the monitor 202 is to be mounted to the top of a cubical wall 236, as shown in FIG. 9, the length of the second segment 212 is adjusted to be slightly greater than the width of the cubical wall 236 (typically about 2 to 4 inches). Support 208, folded to the first position, is slipped over the top of the cubical wall 236 to hang the monitor 202. If necessary, the pressure plate assembly 234 is tightened against the cubical wall 236 to secure the monitor/hanging support assembly 200. The monitor may then be pivoted vertically and/or horizontally about the ball and socket joint 226 of mount 206 so that a user may adjust the monitor's tilt angle to suit his or her viewing needs. Similarly, if the monitor 202 is to be mounted to the top of computer case 238, as shown in FIG. 10, essentially converting the separate monitor 202 and computer case 238 into an integrated "all in one" type computer system with the monitor 202 mounted directly to the case 238. In this embodiment, the length of the second segment 212 of support 208 is adjusted to be slightly greater than the width of the case 238 (typically about 6 to 8 inches) and the support 208 slipped over the top of the case 238. The pressure plate assembly 234 is tightened against the computer case 238 to secure the monitor/hanging support assembly 200 to the case. The monitor may then be pivoted vertically and/or horizontally about the ball and socket joint 226 of mount 206 so that a user may adjust the monitor's tilt angle to suit his or her viewing needs.

Referring now to FIG. 11, the convertible hanging support 204 is shown folded for use as a desktop stand in accordance with an exemplary embodiment of the invention. Support 208 is folded to its second position wherein the bottom surface of second segment 212 is disposed generally adjacent to the outer surface of the first segment 210. Similarly, the third segment 214 may be doubled against the bottom surface of the second segment 212. The monitor 202 is pivoted vertically about ball and socket joint 226 of mount 206 so that hinge 216 is rotated toward, and may optionally contact, the back surface of the monitor 202. This places first segment 210 at an angle to the back surface of the monitor 202 thereby providing an A-shaped support for supporting the monitor 202 on any generally horizontal surface 240 such as a desktop, tabletop or the like. If the user later wishes to hang the monitor 202 on an object, for example on a cubical wall 236, as shown in FIG. 3, support 208 may again be folded to the first position, shown in FIGS. 7 through 10.

It should be appreciated that, while the hanging supports described herein in accordance with the present invention is shown as being used for mounting or supporting a flat panel display monitor, hanging supports in accordance with the present invention may also be adapted for use with other devices such as thin computers, cellular telephones, cameras, camcorders, copy holders, picture frames and the like.

It is believed that the convertible flat panel display monitor hanging support of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A convertible support for a flat panel display monitor, comprising:
   a support including a first segment and a second segment joined to said first segment so that said support may move between a first position wherein said second segment extends outward from said first segment and a second position wherein said second segment is disposed generally adjacent to said first segment; and
   a mount coupled to said support for attaching said support to the flat panel display monitor;
   wherein said support is suitable for attachment to an object when in the first position and forms a stand for supporting said monitor on a generally horizontal surface when in the second position and wherein the length of said second segment is adjustable.

2. The convertible support as claimed in claim 1, further comprising a hinge joining said first and second segments.

3. The convertible support as claimed in claim 1, further comprising a third segment joined to said second segment opposite said first segment, said third segment extending generally perpendicularly from said second segment when said support is in the first position for securing said support to the object.

4. The convertible support as claimed in claim 1, wherein said mount comprises a joint suitable for allowing the monitor to be pivoted relative to said support.

5. The convertible support as claimed in claim 1, wherein said second segment comprises telescoping segment portions extendible with respect to each other so that the length of said second segment may be adjusted.

6. The convertible support as claimed in claim 3, further comprising a hinge joining said second and third segments.

7. The convertible support as claimed in claim 3, further comprising a pressure plate adjustable for tightening the support onto the object.

8. The convertible support as claimed in claim 4, wherein said joint is a ball and socket joint.

9. The convertible support as claimed in claim 7, further comprising a thumb screw extending through said third segment and joined to said pressure plate, wherein said pressure plate is adjusted by said thumb screw.

10. A flat panel display monitor assembly, comprising:
    a flat panel display monitor;
    a support including a first segment and a second segment joined to said first segment so that said support may fold between a first position wherein said second segment extends outward from said first segment and a second position wherein said second segment is disposed generally adjacent to said first segment; and a mount coupled to said support for attaching said support to said flat panel display monitor;

wherein said support is suitable for attachment to an object when folded to the first position and forms a stand for supporting said flat panel display monitor on a generally horizontal surface when folded to the second position and wherein the length of said second segment is adjustable.

11. The convertible support as claimed in claim 10, further comprising a hinge for joining said first and second segments.

12. The convertible support as claimed in claim 10, further comprising a third segment joined to said second segment opposite said first segment, said third segment extending generally perpendicularly from said second segment when said support is folded to the first position for securing said support to the object.

13. The convertible support as claimed in claim 10, wherein said mount comprises a joint suitable for allowing the monitor to be pivoted relative to said support.

14. The convertible support as claimed in claim 11, wherein said second segment comprises two or more segment portions extendable with respect to each other so that the length of said second segment may be adjusted.

15. The convertible support as claimed in claim 12, further comprising a hinge joining said second and third segments.

16. The convertible support as claimed in claim 12, further comprising a pressure pate adjustable for tightening the support onto the object.

17. The convertible support as claimed in claim 13, wherein said joint is a ball and socket joint.

18. The convertible support as claimed in claim 16, further comprising a thumb screw extending through said third segment and joined to said pressure plate, wherein said pressure plate is adjusted by said thumb screw.

19. A convertible support for a flat panel display monitor, comprising:

means for supporting the flat panel display, said supporting means being foldable between a first position and a second position;

means for mounting the flat panel display monitor to said supporting means; and means for adjusting the width of said supporting means;

wherein said supporting means is suitable for attachment to an object when folded to the first position and forms a stand for supporting said monitor on a generally horizontal surface when folded to the second position.

20. The convertible support as claimed in claim 19, further comprising means for tightening said supporting means onto the object.

21. The convertible support as claimed in claim 19, wherein said mounting means comprises means for allowing the flat panel display monitor to be pivoted relative to said supporting means.

\* \* \* \* \*